Nov. 6, 1928.
C. H. NORTON
1,690,425
END THRUST BEARING FOR GRINDING WHEEL SPINDLES
Original Filed July 3, 1920
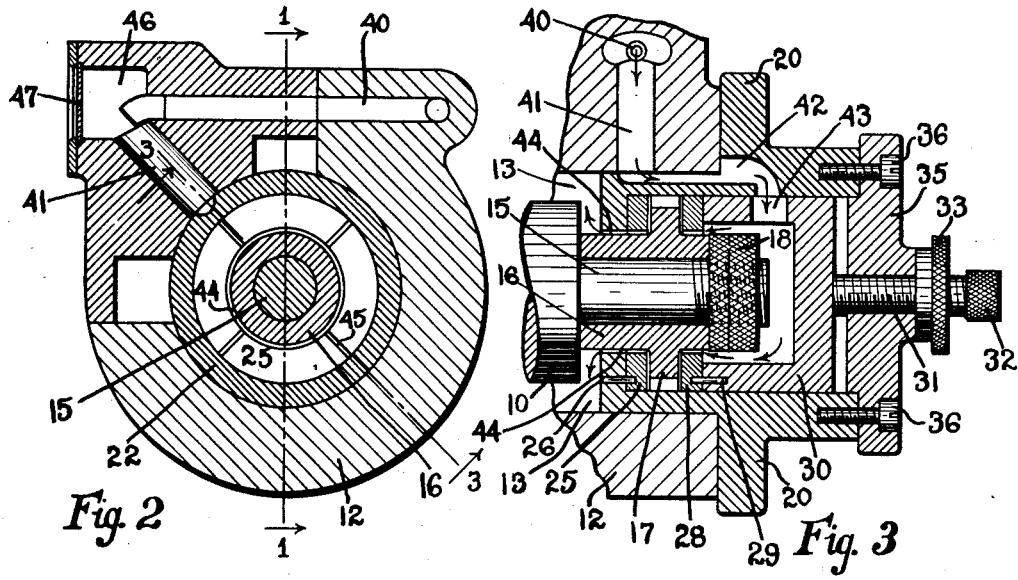
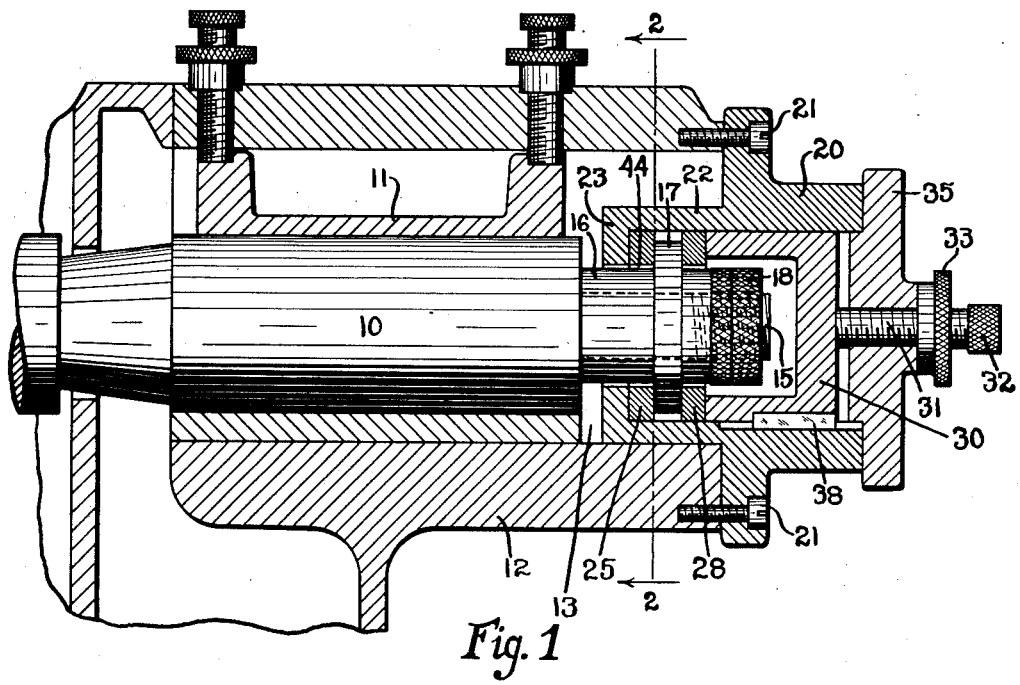
Witnesses
Harold W. Eaton
Leah A. Sessions
Inventor
Charles H. Norton
By Clayton L. Jenks
Attorney Patented Nov. 6, 1928.

1,690,425

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

END-THRUST BEARING FOR GRINDING-WHEEL SPINDLES.

Original application filed July 3, 1920, Serial No. 393,913. Divided and this application filed August 1, 1922. Serial No. 579,031.

My invention relates to a grinding machine and more particularly to an end thrust bearing for the grinding wheel spindle. This case is a division of my prior application Serial No. 393,913, filed July 3, 1920, entitled "Grinding machines," and relates to an improvement in my prior Patent No. 1,189,861, dated July 4, 1916.

One difficulty encountered in the modern precision grinding machine has been that the wheel spindle, which is run at full speed and subjected to high frictional forces, is likely to stick from overheating or lack of proper lubrication or improper adjustment of the bearings, due largely to the parts being so constructed and arranged that while the lengthwise expansion of a spindle may be considerable yet the end thrust bearings are not capable of permitting such movement and still providing the required degree of tightness when the machine is running under normal working conditions.

It is accordingly an object of my invention to produce an improved end thrust bearing for the wheel spindles of such machines which will minimize the deleterious effects of expansion due to heating of the parts and permit proper lubrication of the bearing and which will be convenient of adjustment to take up unavoidable wear and yet will not permit the operator to apply excessive pressure to the bearing to prevent proper lubrication and stick the spindle. Further objects will be apparent in the following disclosure.

In the drawings which illustrate a specific embodiment of my invention:—

Figure 1 is a vertical section partly broken away of a grinding wheel spindle provided with my improved end thrust bearings:

Fig. 2 is a section on the line 2—2 of Fig. 1; and

Fig. 3 is a view similar to Fig. 1 on the line 3—3 of Fig. 2.

A grinding wheel spindle may comprise, as shown in my prior Patent No. 1,191,986 of July 25, 1916, two bearing surfaces separated by a pulley, these surfaces being suitably mounted in radial bearings. The grinding wheel is mounted at one end of this spindle and end thrust bearings are provided at the opposite end. Referring particularly to the drawings, the wheel spindle 10, the left-hand portion of which is broken away, is mounted in suitable radial bearings 11 held in the casing 12 of the wheel slide. These bearings 11 may be constructed of spaced members having partial cylindrical bearing surfaces, the spaces between these members serving for the passage of oil from the right-hand part of the device, as illustrated, to the space 13 where the oil may escape to a reservoir and be returned for further use.

In order that the end thrust or longitudinal play in the grinding wheel spindle may be delicately adjusted, I provide the construction illustrated in the drawings. As there shown, the wheel spindle is provided with a reduced portion 15 outside of the radial bearings. This reduced portion carries a sleeve 16 provided with a flange 17 spaced by a considerable distance from the radial bearings and the larger portion of the spindle. This sleeve with its flange is held rigidly on the shaft by a pair of lock nuts 18. The projecting end of the wheel slide 12 is bored to receive a cap 20 which is attached to the wheel slide hub by suitable screws 21. This cap 20 has an inwardly projecting portion 22 provided with a radially extending flange 23 which projects into the space between the enlarged portion of the wheel spindle 10 and the flange 17 but is spaced from the enlarged portion of the spindle as illustrated. In order to prolong the wearing qualities of this inwardly projecting flange 23, it is provided with a hardened steel collar 25 non-rotatably secured to the flange by a pin 26.

It will be apparent that this collar 25 provides a rigid abutment to take the thrust of the spindle to the left. The thrust of the spindle in the other direction is taken up by a similar hardened steel collar 28 secured by a pin 29 to the end of a cup shaped block 30 which is adjustable outwardly and inwardly by means of a screw 31 which is provided with a knurled head 32 and a lock nut 33. This screw is threaded into a cover plate 35 which is secured to the cap 20 by screws 36. The cup shaped block 30 is prevented from turning in the cap 20 by means of a key 38, as shown in Fig. 1.

In order to insure proper lubrication of the end thrust bearing and the radial bearings, I provide a suitable oil circulating system which includes the passages 40 and 41 in the wheel slide casing and a transverse passage 42 in the cap 20, which open through a hole 43 in the cylindrical wall of the cup shaped block 30 to the interior thereof adjacent the lock nut 18. The hardened steel collars 25 and 28 and the inwardly projecting flange 23 are provided with longitudinal oil passages 44. The collars are also provided with radial passages 45 for the circulation of oil around the flange 17. Hence oil which is poured by a suitable pump through the pipe 40 is carried through the various circulatory passages adjacent the thrust bearing surfaces and thence to the spaces between the radial bearings and to the space 13 within the wheel slide casing, from which the oil may be returned to these passages, thus insuring a perfect lubrication of the bearings. In order that it may be determined whether the oil is flowing properly or not, I also provide a small oil chamber 46 covered with a glass plate 47 which serves as a sight opening for viewing the flow of oil. The flow of oil is indicated by the arrows in Fig. 3.

By means of this construction the end thrust bearings may be adjusted to a fine degree of precision and it will be practically impossible for one to so tighten the bearings as to stick the wheel spindle. This is accomplished by means of the thumb screw 31 which is provided with a knurled head 32, which is made purposely round and knurled so as to prohibit the use of the usual wrench and make it difficult for the operator to set up the screw other than by hand. The size of the head of the screw is such that if the operator turns it by hand he cannot normally put sufficient pressure on the bearings to cause them to stick. As a particular feature in this construction, I have separated the flange 17 and its associated parts from the radial bearings, in order to reduce the amount of elongation and contraction of the material between the two abutment collars 25 and 28, which causes looseness and tightness respectively in the bearing. By the new arrangement, I insure that such change in size is reduced to a negligible amount and that the bearings will always be properly lubricated and cannot be stuck by excessive heat generated by friction therein.

It will also be noted that dust and dirt are fully excluded from the thrust bearings and that the adjustment of the end play may be accomplished without in any way disturbing the remaining portions of the bearings. Furthermore, the wearing parts are of simple construction and may be economically replaced when worn. In order to properly adjust the bearings it is merely necessary to start the machine running and then when the spindle has become warmed up to adjust the thumb nut by hand only by a gentle pressure, after which the check nuts are tightened up also by hand.

Having thus described my invention, it will be evident that changes and modfications may be made therein by those skilled in the art without departing from the spirit and scope thereof as set forth in the claim, and I do not wish to be otherwise limited to the details herein disclosed.

What I claim is:—

A grinding wheel mounting comprising a casing, a radial bearing mounted therein, a wheel spindle mounted in and extending beyond the end of the radial bearing, a flange on the extension of the spindle spaced from the end of said radial bearing, an annular thrust receiving flange rigidly mounted on the casing and depending between the flange on the spindle and the radial bearing and spaced from the latter, an adjustably positioned outer thrust receiving cup engaging the opposite side of the spindle flange and readily accessible means to adjust the position of said cup during rotation of the spindle.

Signed at Worcester, Massachusetts, this 27th day of July, 1922.

CHARLES H. NORTON.